United States Patent [19]

Crouse et al.

[11] Patent Number: 5,634,022
[45] Date of Patent: May 27, 1997

[54] MULTI-MEDIA COMPUTER DIAGNOSTIC SYSTEM

[75] Inventors: William G. Crouse; Malcolm S. Ware, both of Raleigh, N.C.

[73] Assignee: International Business Machines Corporation, Armonk, N.Y.

[21] Appl. No.: 847,128

[22] Filed: Mar. 6, 1992

[51] Int. Cl.$^6$ ............................................ G06F 11/00
[52] U.S. Cl. .................. 395/704; 364/261.3; 364/262.2; 364/262.4; 364/DIG. 1
[58] Field of Search .................................. 395/375, 575; 371/16.1

[56] References Cited

U.S. PATENT DOCUMENTS

| | | | |
|---|---|---|---|
| 4,592,053 | 5/1986 | Matsuura | 371/29 |
| 4,802,165 | 1/1989 | Ream . | |
| 4,920,538 | 4/1990 | Chan et al. | 371/19 |
| 5,113,501 | 5/1992 | Ishikawa | 395/375 |
| 5,142,679 | 8/1992 | Owaki et al. | 395/700 |
| 5,233,611 | 8/1993 | Triantafyllos et al. | 371/16.1 |

FOREIGN PATENT DOCUMENTS 0422945  10/1990  European Pat. Off. .

OTHER PUBLICATIONS

Technical Disclosure Bulletin, vol. 16, No. 2, Jul. 1973 "Nondegrading Operation System Hooking" by J. F. Grant.

*Primary Examiner*—Kevin J. Teska
*Assistant Examiner*—Ayni Mohamed
*Attorney, Agent, or Firm*—Steven B. Phillips; Edward H. Duffield

[57] ABSTRACT

Multi-media computer system diagnostic system for fault isolation in a multi-tasking hard, real-time task environment is described. Hard, real-time multi-tasking operations, particularly those unique to signal processing tasks may be monitored without creating a task processing overload and without delaying the results beyond hard, real-time task deadlines by insertion of a branch instruction in the task execution instructions being examined which cause execution of the task to branch to a diagnostic program. The diagnostic program executes a diagnostic instruction set and captures one or more digital samples characteristic of the operation of the hard, real-time task at the point in its program execution where the branch instruction was located. The digital data samples so obtained may be queued and graphically plotted on the screen of a display associated with the computer system to generate a graphical representation of the performance of the algorithm or signal processing task under examination in order to quickly isolate task malfunctions without having to review a mass of digital data samples. Alternatively, pre-selected samples may be injected into the task execution by loading task registers with predetermined data by executing a branch to a diagnostic function which inserts the samples.

9 Claims, 13 Drawing Sheets

FIG. 1A

| INS.# | INST. |
|---|---|
| 100 | r2 = SAMPLE (r0) |
| 101 | r2 x r5 |
| 102 | r3 = rmm |
| 103 | r2 = r2 + r3 |

FIG. 1B

| INS.# | INST. |
|---|---|
| 100 | r2 = SAMPLE (r0) |
| 101 | r2 x r5 |
| 102 | b 600 (BRANCH TO DSP PROBE CODE) |
| 103 | r2 = r2 + r3 |

FIG. 1C

|  | INST. |
|---|---|
| 600 | r3=rmm (RELOCATED INST. #103 FROM WHERE BRANCH WAS PLACED) |
| 601 | SAVE R0=r0 |
| 602 | SAVE R1=r1 |
| 619 | SAVE DESIRED DATA TO CIRCULAR BUFFER |
| 627 | r1 = SAVE R1 |
| 628 | r0 = SAVE R0 |
| 629 | b 103 (BRANCH BACK TO DSP PROGRAM) |

(FROM FIG. 7)

(FROM FIG. 8)

| | | | | | | |
|---:|---:|---:|---:|---:|---:|---:|
| 257 | 12777 | 23351 | 30371 | 32766 | 30174 | 22987 |
| 12301 | 258 | -12778 | -23352 | -30372 | -32767 | -30175 |
| -22988 | -12302 | 257 | 12777 | 23351 | 26159 | 32766 |
| 30174 | 22987 | 12301 | -258 | -12778 | -23352 | -30372 |
| -32767 | -30175 | -22988 | -12302 | | | |

MULTI-MEDIA COMPUTER DIAGNOSTIC SYSTEM

RELATED PATENTS AND APPLICATIONS

This application is related to commonly assigned U.S. Pat. Nos. 4,794,517 and 5,081,574 and to pending application Ser. Nos. 07/425,150, 07/761,534 and 07/829,201 which deal with a preferred, high speed digital signal processor computer system and various elements thereof.

BACKGROUND

This invention relates generally to digital signal processing, debugging or fault analysis methods and systems and particularly to those involved in high speed, multi-tasking signal processor environments such as those encountered in multi-media systems.

PRIOR ART

Execution fault isolation or, so-called "debugging", is a well known process in the general computer system arts. However, for hard, real-time digital signal processing tasks, special problems are encountered. For example, tasks such as those involved in handling real-time digital data streams are commonplace in the multi-media environment. Modems, fax machines, compact disc playback, audio functions, voice recognition, voice synthesis, motion video and a variety of compaction routines, Fourier transforms, servo systems and the like are all examples of signal processor tasks that present a unique challenge to the discovery and correction of algorithmic or logical faults, many of which may occur only under transitory circumstances.

Numerous families of digital signal processors are available in the marketplace from a variety of suppliers. These systems have standard development features normally found in debugging general programming systems. These features include the capability of stepping through the execution of a program a single step at a time, for capturing sequences of results or data and a variety of non real-time functions such as logical fault isolation routines, stop on flag condition and the like. These capabilities have a fundamental limitation in that they cannot adequately address a variety of real-time signal processing tasks for which the incoming data and signals are transitory and subject to randomly occurring noise and other faults. The prior art debugging routines for such digital signal processors as heretofore available borrow from classical computer and microcode development techniques without providing any way to track and observe, in real-time, the actual operation of the digital signal processor as it executes a given task. Furthermore, such systems have not included any way to store and recreate the results of an error condition which would enable closer scrutiny of the operative task instructions. For example, in speech processing, data comes from a microphone in analog form, is digitized in an analog-to-digital converter at some sampling rate such as 8,000 samples per second, and then passed to a speech signal processing algorithm for execution in a digital signal processor. Such a program will not stand still for prior debugging techniques such as single step and stop on address operations because if the program execution stops, no further processing is possible but the speech signals do not stop arriving. Additionally, signal processing task execution codes may be quite complex and their results are transitory digital data samples that are only meaningful to humans if they are presented in some graphic form. For example, even a simple sine wave is difficult to diagnose or analyze when it is presented as a string of numbers only. Interaction between multiple waveforms over time, if only represent by various strings of such numbers, may be humanly incomprehensible. It will be difficult to even identify a "bug" or programming flaw in a signal processing task under execution. Conventional fault analysis and diagnosis tools have simply been inadequate.

With a conventional diagnostic system one would be able to stop at any one of the numbers representing sample points in a sine wave, but stopping at any one number or sample would not identify a problem. A number of such samples might be gathered and stored, and a table generated to represent the values; but then with a number of samples arriving at approximately 8,000 per second, 32 samples will occur in only four milliseconds. There is no guarantee that a particular error sample will be found within four milliseconds. What if the values were captured for as long as a second 8,000 samples would be present and if the error occurred during one second, it is possible that a table of 8,000 values might be studied and a problem identified as a odd looking number in the list, but this would be difficult, time consuming and inaccurate at best. And what if this probing and capture function does not result in trapping an error condition? Some other aspect may have to be examined and debugged until the problem is found; and again the difficulty remains of recognizing the problem even when it is in hand.

Considering the extrapolation of this problem to the multi-tasking hard, real-time environments present in multi-media systems only exacerbates the problem encountered and makes finding of the specific error conditions present when a asynchronous or randomly occurring fault occurs that much more difficult.

OBJECTS OF THE INVENTION

As a result of these difficulties and shortcomings of the known prior art, it is an object of this invention to provide an improved, hard, real-time multi-processing task diagnostic method and system which operate in real time without creating processing delays that distort a task's hard, real-time performance and which capture data that may be graphically displayed and plotted for analysis and identification of error conditions within the same time period.

Yet another object of the invention is to provide a flexible means by which predetermined values may be injected into the operation of hard, real-time signal processing tasks during their execution without interruption or distortion of their operational speed and conditions.

BRIEF SUMMARY OF INVENTION

The foregoing and still other objects that have not been specifically enumerated are met in the preferred embodiment of the invention in which a diagnostic system enables a developer or programmer to create branch instructions for execution in mid-stream of the flow of executing a signal processing task at any desired point. The branch instruction branches the internal operation and execution of a task to execute instructions in memory for diagnostic purposes which may include capturing of specific transitory register contents and the like in a queue or circular buffer from which the results may be utilized to drive a graphical screen plot or printout. The effect is much like having a physical probe that can be placed at any point in the logical execution of a given task whose results will drive an oscilloscope; however, no oscilloscope is provided since the display screen of the normal multi-media computer system may be utilized, together with a plotting program and the resources of the computer itself, to create a graphical display of the complex values and sequences that may occur in the sample stream. Similarly, predetermined test data values or sample values may be queued into memory and, upon executing a branch, injected into the specified registers overriding whatever may be there to allow for the creation of simulated conditions within the execution of a hard, real-time task without distorting the real-time performance of the task's execution. The branching and execution of a few alternative test instructions does, however, present some loading on the resources of the digital signal processor, so a determination is made before invocation of the diagnostic functions as to whether their invocation will cause delay or program overrun conditions that would cause the signal processor to miss a task execution deadline. If such a result would occur, the user or diagnostician may be asked to shut down various tasks to free up digital signal processor resources for performance of the diagnostic tasks. This assures that results may be within hard, real-time constraints and presented graphically to a user when they are occurring or during the time interval in which they occur. This is a substantial aid in identifying and locating and/or recreating error conditions.

The invention will now be described with reference to a preferred embodiment thereof which is further shown and described in the drawings, in which:

BRIEF DESCRIPTION OF DRAWINGS

FIGS. 1A, 1B and 1C illustrate in a pictorial manner a sub-sequence of several hypothetical task execution instructions in a digital signal processor both before the insertion of a branch probe instruction, after branch insertion, and during execution of the branch, respectively.

FIG. 3 illustrates 3A and 3B combined.

DETAILED DESCRIPTION OF PREFERRED EMBODIMENT OF INVENTION

Figure 11:
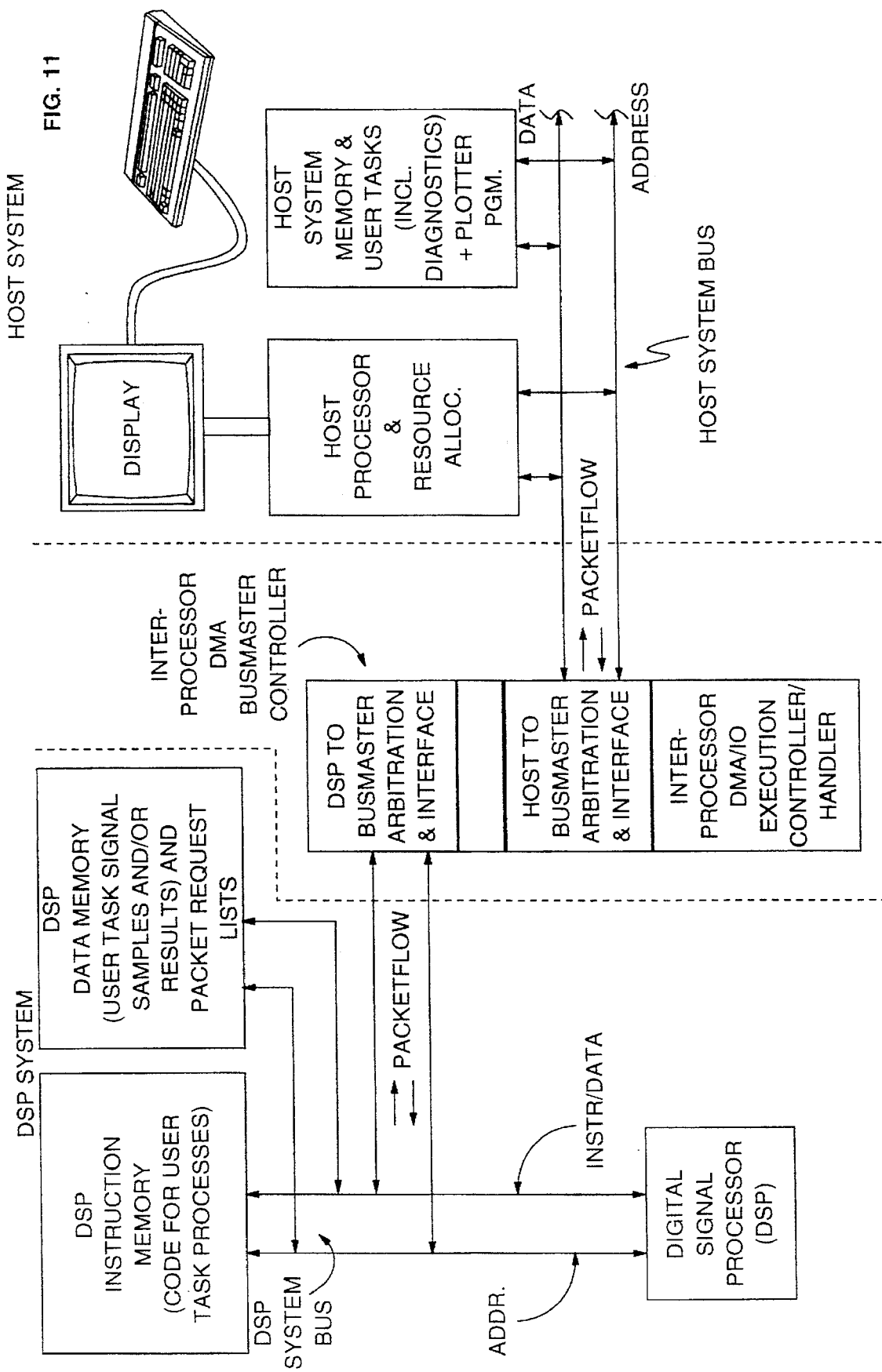
FIG. 11 illustrates schematically an overview of an entire digital signal processing multi-media computer system environment including a host computer with associated keyboard and display for data entry and observation, an interprocessor communication or control system and a digital signal processor system including the processor and its own instruction and data memories which may be exercised and utilized by the preferred embodiment of the present invention.

At the outset, FIG. 11 may be referred to as a general example of a multi-media computer system employing a host computer including a processor such as the typical Intel 80386, a display monitor, keyboard and typical system memory. The host system communicates with the digital signal processor (DSP) subsystem via a DMA bus controller in a system such as identified in the commonly assigned application Ser. No. 07/761,534 identified above. However, digital signal processors (DSPs) are available from a variety of vendors as are host system processors and DMA controllers, so the present preferred embodiment is not limited specifically to the implementations illustrated in FIG. 11.

For the purposes of carrying out diagnostic analysis, this invention includes the capability of performing hard, real-time data signal sample probing operations and hard, real-time data signal sample injection operations with graphical display capability of the results at any point in the operation. In the preferred embodiment, operating digital signal processor tasks are modified to include one or more branch instructions in their execution stream. The branch instructions cause the signal processor during execution of the task to branch to some auxiliary instructions. These instructions involve either capture of selected register data or samples and return to the branched-from instruction execution sequence or, in the alternative, branch to diagnostic code that can, instead of capturing signal sample conditions, write them into designated registers, thereby injecting them into the process flow for execution.

FIG. 1A illustrates a hypothetical digital signal processor program sequence of several instructions arbitrarily numbered 100–103 as shown in FIG. 1A. The instructions include setting of a register value for a hypothetical register R2 equal to some sample value presumed to come from some prior operation, a multiplication of the register R2 contents by some register R5 contents, the setting of R3 to the result of multiplication (RMM) followed by instruction 103 which stores the sum of the value of R2 and the value of R3. This is a hypothetical routine illustrating but a few typical instructions that may be encountered in the processing of a signal processing instruction list according to some desired task for the signal processor.

FIG 1B illustrates the same sequence of instructions as FIG. 1A but in which instruction 102 has been replaced by a branch instruction to a new address in the instruction memory with an arbitrary sequence number of 600 in this illustration.

In FIG. 1C, a branched to code beginning with instruction 600 is hypothetically illustrated with instruction 600 being the relocated original instruction 102 which was replaced by the branch instruction in FIG. 1B. Execution of this branched to code causes the execution of the specific relocated instruction and then, as may be seen by the instruction 601, 602–625, completion of operations such as saving register contents for designated registers, saving of the desired data in a circular buffer and the resetting of register contents with a branch back to the next instruction in the original DSP task sequence, 103, are all carried out.

From the foregoing it may be seen that the present invention relies upon placement of a branch instruction at any desired point or points in the execution of a given digital signal processor task whose operation is to be diagnosed. Execution of the branch instruction and the instructions encountered in the branched to portion of diagnostic code do cause some loading of the digital signal processor system in addition to that of the normal task execution demands already present. Therefore, in order to assure that the results of the probing and capture of data sample values such as shown in the hypothetical example in FIGS. 1A–1C will not themselves cause error or overloads, a determination must first be made that the additional loading presented by the diagnostic task in addition to any active signal processing tasks will not cause an overload of the signal processor's resources and thereby create a malfunction of its own. Additionally, it is desired to be able to gather the data samples during the time period in which hard, real-time results are required from the signal processor system so that the results may be displayed graphically and concurrently in real-time as well. This greatly facilitates the identification and isolation of error conditions as they occur.

Figure 2:
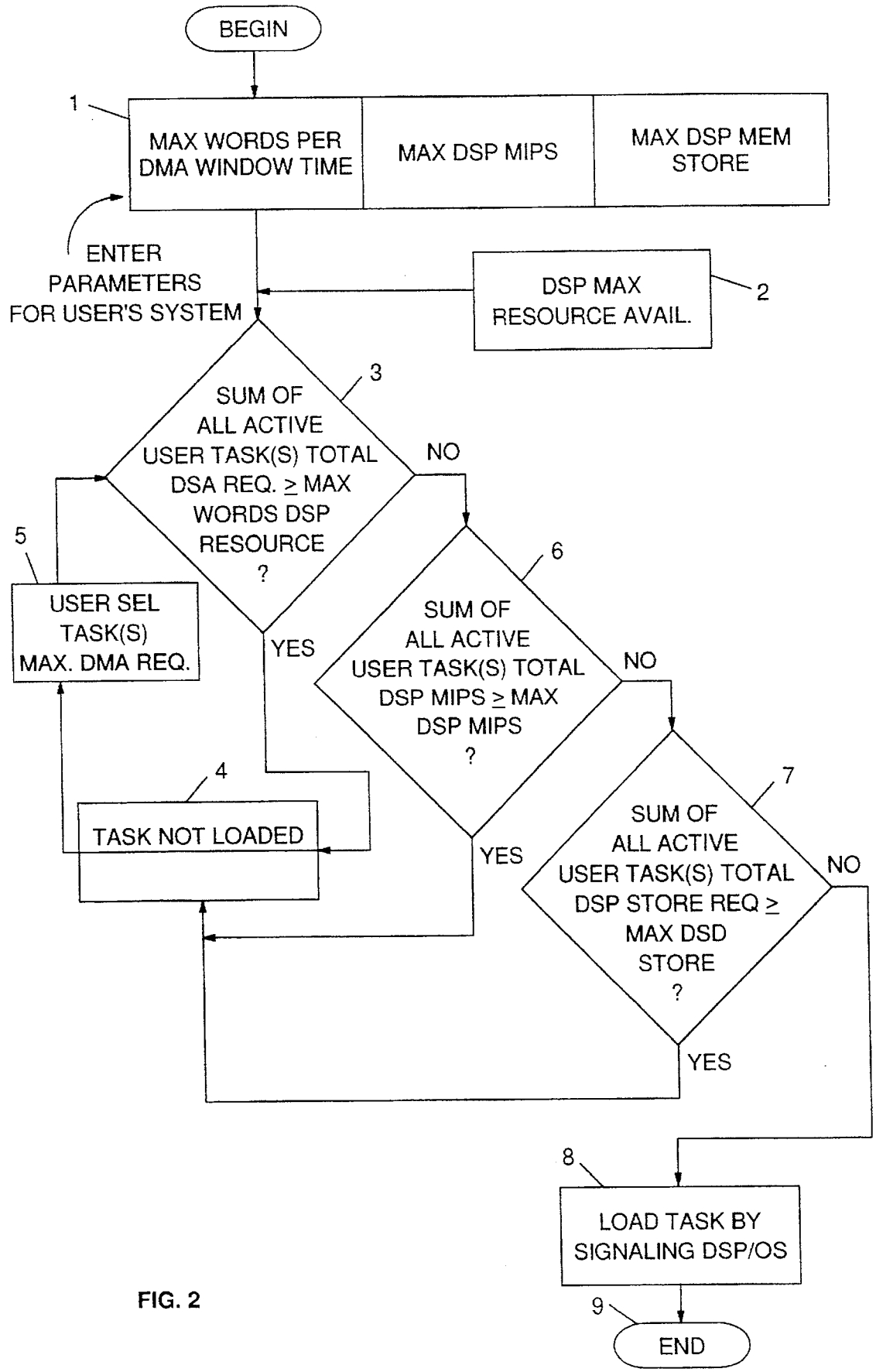
FIG. 2 illustrates a preferred process for determining whether the signal processor resources will be overloaded by running tasks concurrently with a diagnostic function.

FIG. 2 illustrates the general flow of the process for the checking at invocation of a new signal processor task, such as the diagnostic task of inserting a capture probe and executing a branch to instruction which will cause capture of data register contents will not overload the system. The flow begins in box 1 with the user or diagnostician entering the parameters from the user system as to the bandwidth required to operate, for example, the capture probe diagnostic routine. The maximum DSP resource available in terms of bandwidth or millions of instructions per second (MIPS) is gathered from the system in block 2 and in block 3 the sum of all the active tasks including the user's newly invoked diagnostic task is formed and compared against the maximum DMA resource availability. If the maximum availability of the DSP system will be exceeded, the task is not loaded as shown by the block 4 and the user is directed in block 5 to select or deselect from among those tasks running in the DSP system to free up additional resource prior to invoking the diagnostic task.

When the indication is that the sum of all active user tasks including the diagnostic function will not exceed the available power or speed of the digital signal processor itself, as opposed to the DMA bandwidth requirement checked in block 3, an appropriate direction is given either to return to the user to deselect tasks or to provide a further check that the sum of all active user tasks will not create a storage requirement greater than the maximum storage available in the digital signal processor system. Then if these tests are successfully passed, the new task may be loaded by signaling the operating system of the digital signal processor that a new task is to be invoked. The process ends in block 9.

Figure 3A:
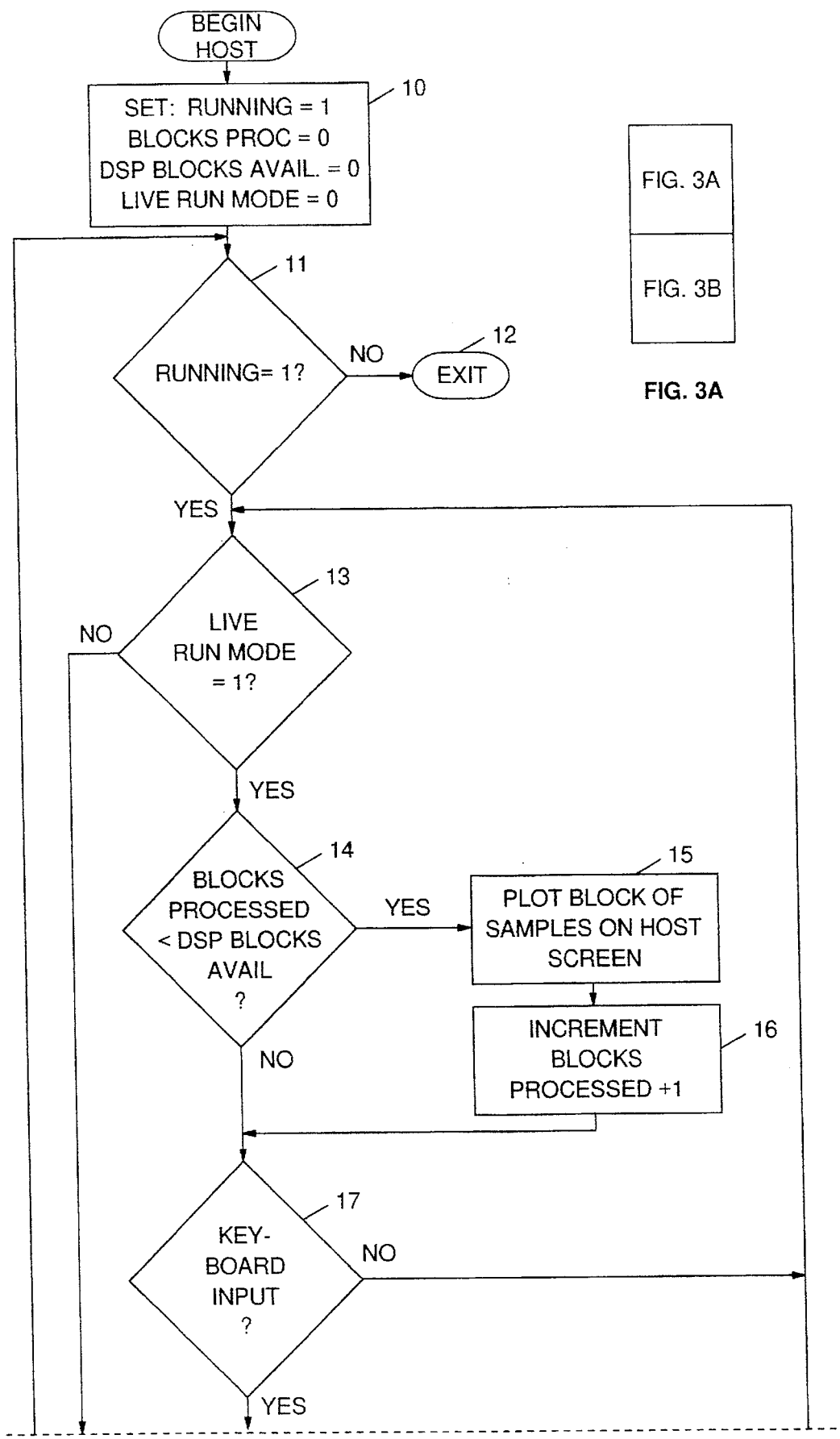
FIG. 3A and 3B illustrate a portion of the schematic logical flow of operations involved in invoking and running a hard, real-time diagnostic to capture a sequence of hard, real-time data signal processing samples or to inject them into the processing stream.
Figure 3B:
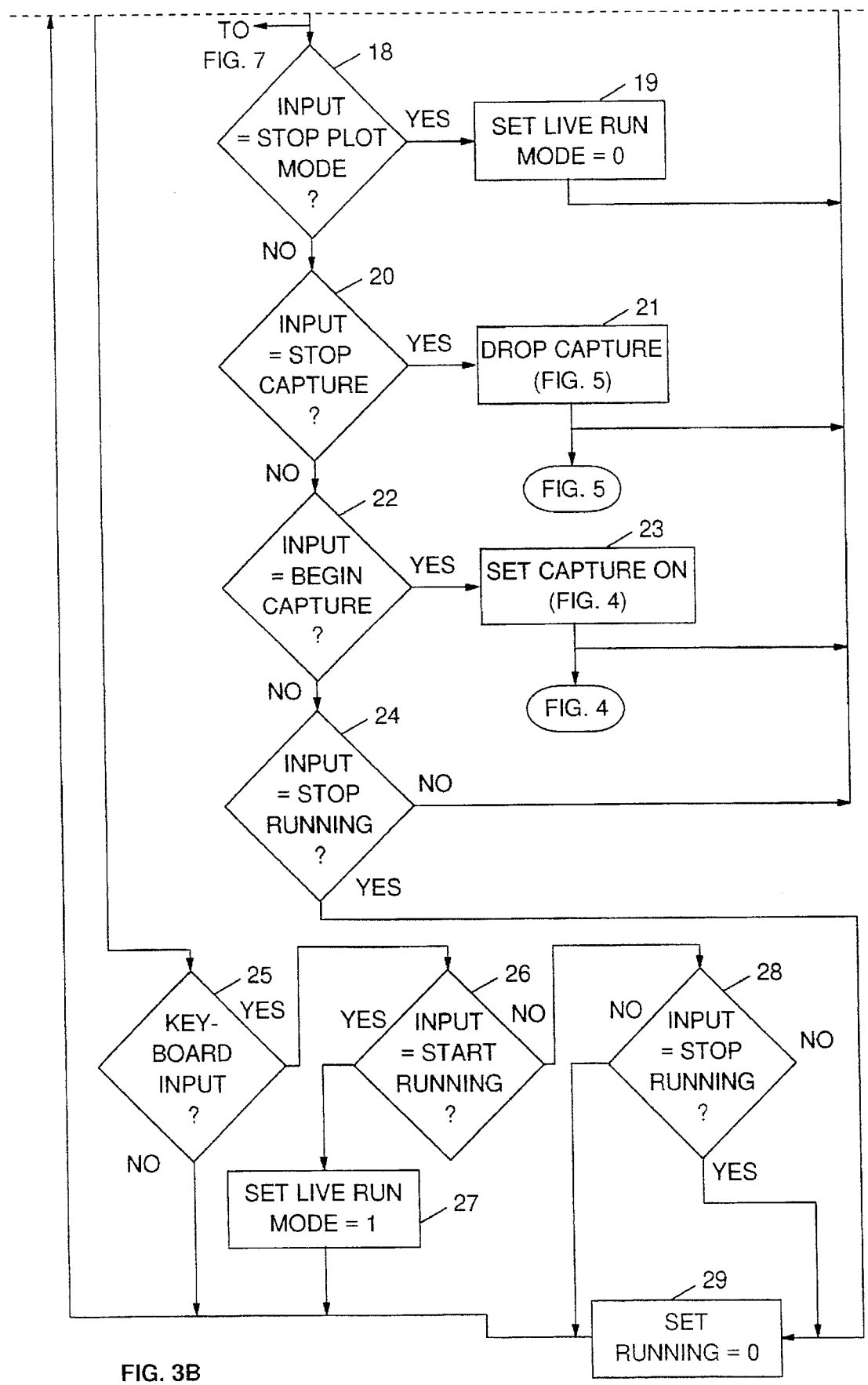

Turning to FIG. 3, and the associated interrelated FIGS. 4–10, the preferred embodiment of the overall flow of the diagnostic task is described beginning with block 10 in FIG. 3.

In block 10 of FIG. 3, preliminary data entry by the user for invoking diagnostic tasks requires that the diagnostic task in the host system of FIG. 11 be loaded and running, with the "Running" indicator set to 1 (or "on"), that the "Blocks of Data Processed" is originally 0 and that the DSP system contains no blocks of data available for plotting, and with the "Live Run Mode" condition is equal to 0. This is equivalent to a prescription for starting conditions in which no diagnostic task has been invoked and it is desired to traverse the diagnostic system flow from the start.

Blocks 11 and 12 comprise a check of the System Running indicator which, if successfully passed, exits to block 13 to determine if the Live Run Mode condition is set ON. If the Running indicator in block 11 is not set ON, the flow exits to block 12 where the diagnostic routine is exited. If the Live Run Mode check in block 13 is successful, block 14 is entered where the number of blocks of data processed (where a block may be any arbitrarily designated number of samples, data bits or the like) at this point in time is less than the number of DSP data blocks stored in a queue or circular buffer and available for display or analysis. If this check indicates that more DSP data blocks are available, exit to block 15 which begins plotting the next block of samples on the host computer screen followed by incrementing the "blocks processed" sample count in block 16 and return to the main flow for input to block 17 where a check is made of whether any keyboard input is present. If no keyboard input signals are present, the flow returns to the input of block 13 so that any additional blocks of data may be displayed.

If there is keyboard input in block 17, a determination must be made as to whether the capturing of data or the injection of data is being requested by the diagnostician. The capturing of data checks begins with blocks 18 and 19 to determine if the keyboard input is a signal to stop the Plotting Mode or not and turn off the Live Run indicator in block 19 if the indication is to Stop Plotting. If the input is to Stop Capturing data, blocks 20 and 21 are invoked which leads to further operations in FIG. 5 as will be described later and also to a return, as does exit from block 19, back to the input of block 13 to continue processing. Block 22 checks for whether a data capture operation is being requested and, if so, exits to block 23 to set the capture conditions on and continues into FIG. 4 as will be described later. It also returns via line back to the input of block 13 to check for any further blocks of data. Finally, block 24 is entered to determine if a Stop Running command is present from the keyboard input. If not present, operation continues back to the input of block 13 but otherwise sets the Running condition to 0 in block 29 and loops back to the input to block 11 to determine if any new running condition has been established and if not, to exit in block 12.

If the Live Run Mode is not ON in block 13, the flow proceeds to block 25 to determine whether any keyboard inputs are presently active which might involve resetting of the Live Run Mode and/or the running conditions. If keyboard input is present, the input is examined in block 26 to see if a command to Start Plotting or if a command to Stop Running (block 28) have been presented. If the check in block 26 shows that a start of a plotting command is given, block 27 is entered to set the Live Run Mode equal to 1 and continue operation back to block 11. Otherwise, a check is made in block 28 to see if the command is an input to Step Running and if so, block 29 is entered to set the running condition to 0 and operation will continue back to the input of block 11 as well.

Figure 4:
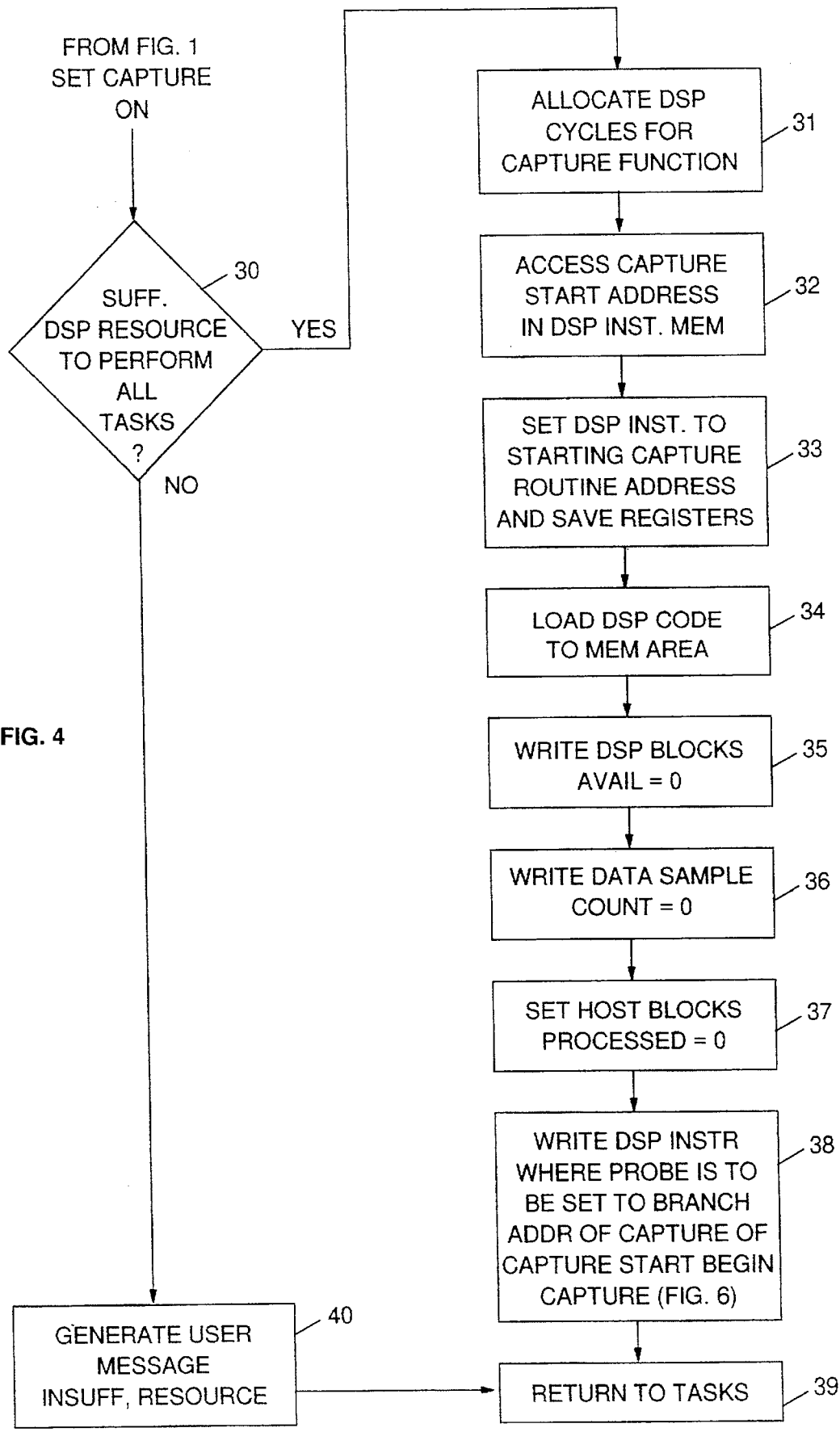
FIG. 4 illustrates the schematic flow of the capturing of data samples according to the preferred embodiment.

FIG. 4 illustrates schematically the flow of operations when the capture condition is set ON from block 22 and 23 in FIG. 3. If the capture condition is set ON, a command is being entered by a user which will require the performance of a diagnostic routine, hence a check is made in block 30 to determine, in accordance with the general checks made as described with respect to FIG. 2, that sufficient DSP resource exists to perform all the tasks. If insufficient resource is found, block 40 is entered to generate a user message that "insufficient resource" is available, thereby indicating that turning off certain signal processor tasks may be required prior to invocation of the diagnostic routine.

If the test in block 30 is positive, then sufficient resource exists and blocks 31–39 are entered in sequence as shown to cause the digital signal processor cycles to be allocated for the capture function according to the indicated parameters entered by the user from FIG. 2, to access the capture routine starting address in the DSP's instruction memory (block 32) and to set the DSP instruction following a branch instruction to the starting of the capture routine address, for saving registers. Block 34 moves the DSP instruction from the point where the branch instruction is to be written to the memory area where it may be the first instruction executed after the branch. Blocks 35 and 36 and 37 set the DSP data blocks and host system data sample counts and block counts to their initial 0 condition. Block 38 begins with the writing of the actual branch instruction to the DSP instruction address where the probe is desired to be set which, when reached in the execution of the particular task, will cause the capturing operation to start as is shown in greater detail in FIG. 6. When the capturing operation in FIG. 6 completes, the instruction returns to the next instruction in the digital signal processor's task in memory as shown by the instruction 629 in FIG. 1C which branches back to the original DSP instruction set at the next instruction following the place where the original branch was inserted.

Figure 5:
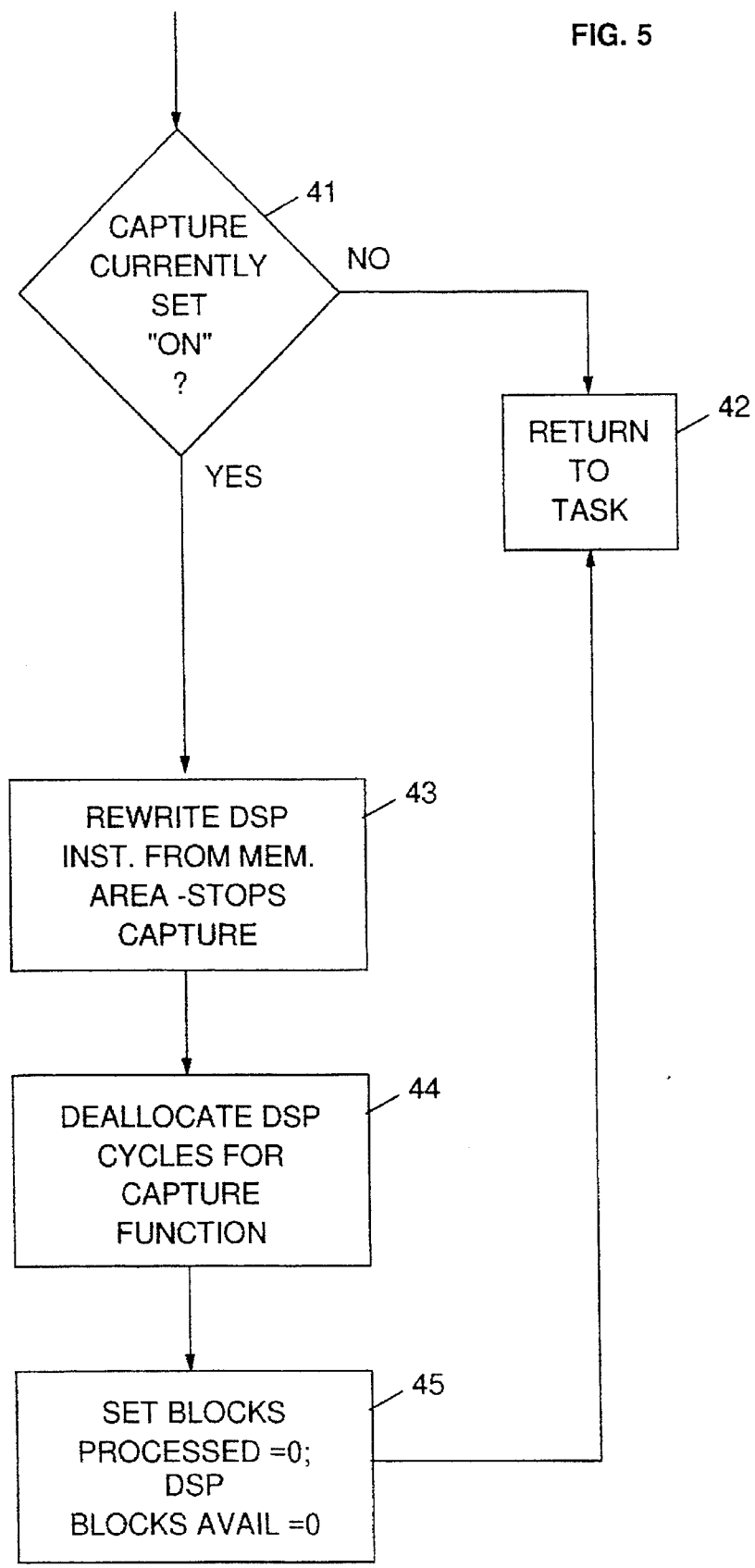
FIG. 5 illustrates the method for deallocating the capturing function in a preferred embodiment.

FIG. 5 illustrates the processes involved when the capture condition is invoked beginning in block 41 and dropping of the capture provision of the diagnostic has been chosen by the user via input that was detected in blocks 20 and 21 o FIG. 3. FIG. 5 thus shows the flow when stopping of the capture condition is desired. When the stop condition is detected, block 43 is entered which rewrites the original DSP instruction removed from its position in the DSP task sequence from the memory area where it was stored back to its original location which will overwrite the branch instruction there and stop any further invocation of the capture diagnostic at that point. Block 43 deellocates the DSP cycles for the capture function and block 45 resets the block counts for data available from the DSP and the blocks to be processed by the host back to 0 and then returns to the user task via block 42.

Figure 6:
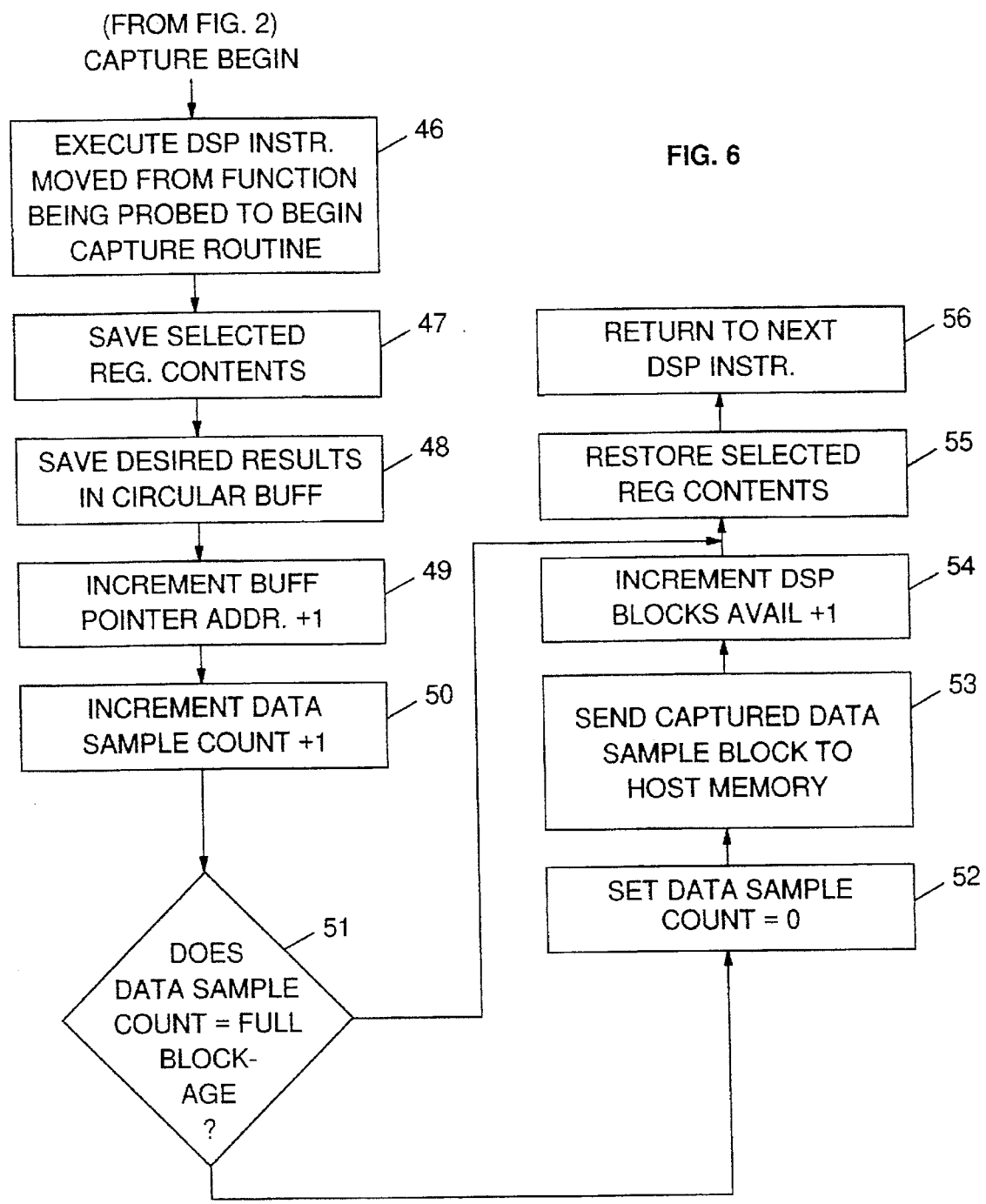
FIG. 6 illustrates schematically the flow of operations for the actual data sample capturing process in the preferred embodiment.

FIG. 6 illustrates the actual steps during the capturing routine invoked from block 38 of FIG. 4. In block 46, an instruction is executed to move a DSP instruction from the function being probed, or for which data capture is desired, from its position in the normal execution list to memory area to begin the capture routine preparations. Block 47 saves any selected register contents, capturing the condition of the digital signal processor at this instant, and saves the desired results, as specified by a user, in a circular buffer in block 48. In block 49 the buffer pointer address is incremented and in block 50 the data sample count is incremented. Block 51 checks whether the data sample count is finally equal to a full block size count which may be any arbitrary size and if "yes", resets the data sample count and sends the captured data sample blocks to the host system's memory in block 53 where it will be utilized for plotting or other analysis. Block 54 increments the DSP data sample block availability and blocks 55 and 56 restore the selected register contents and return the diagnostic system to the next DSP task instruction via block 39 of FIG. 4.

Figure 7:
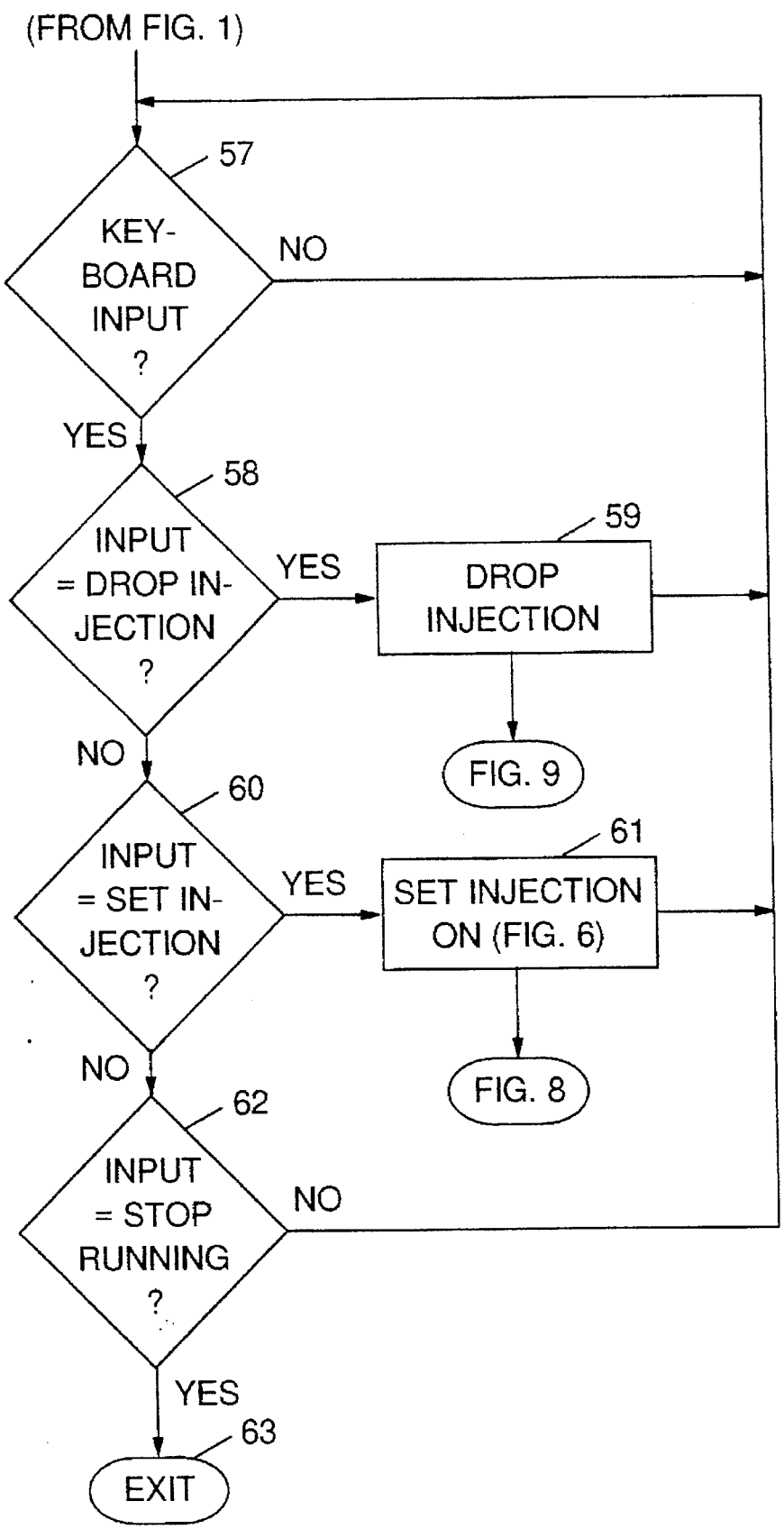
FIG. 7 illustrates schematically the flow of operation for either stopping or beginning the injection of pre-selected data samples into the operation of a hard, real-time task according to the preferred embodiment of the invention.

FIG. 7 illustrates schematically the flow of the diagnostic process where keyboard input is examined as in FIG. 3 at the input to block 18 to determine whether a command to drop or to begin injection of arbitrary data into a signal sample processing stream for the digital signal processor is desired. Blocks 57–63 are self-explanatory and complete the checks to determine the user's input command either to drop the injection function or to set the injection function ON. Dropping of the injection function invokes the processes in FIG. 9 that will be described later while setting the injection function ON involves processes shown in FIG. 8.

Figure 8:
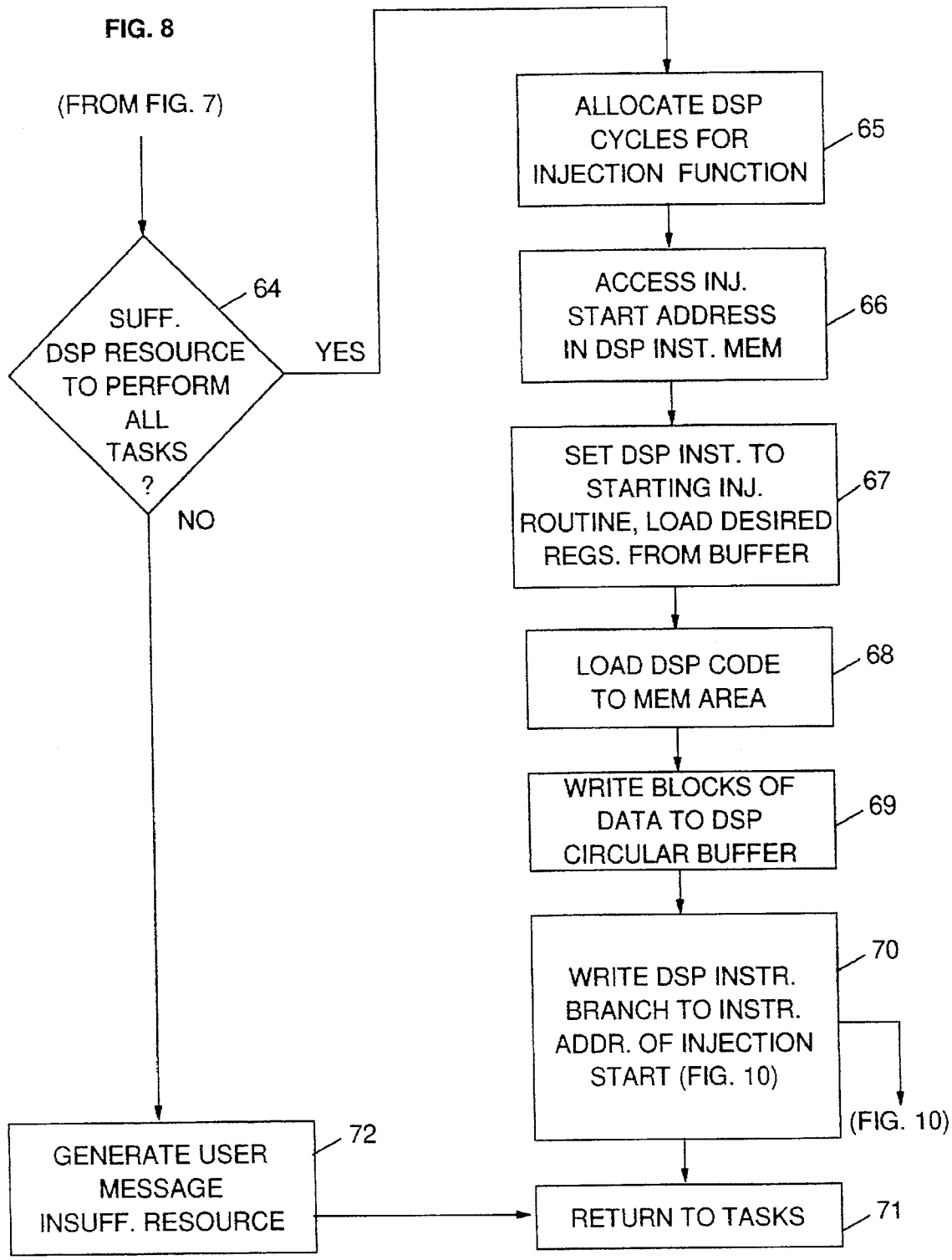
FIG. 8 schematically illustrates the procedural flow for injecting preselected samples into the operation of a signal processing task according to the preferred embodiment of the invention.

FIG. 8 shows the flow of the process where injection has been requested with the beginning step in block 64 being a check to determine that the DSP resource requirement will be within the capability of the system when the injection diagnostic is invoked. If the answer is "NO", exit via blocks 72 and 71 as shown is pursued, but if sufficient resource is available to support the injection function in hard, real-time without an overrun of the tasks, blocks 65–71 are entered in sequence as shown.

Block 65 allocates the DSP cycles for the injection of arbitrary data samples selected by a user. Block 66 accesses the injection start address where the injection routine is located in the DSP's instruction memory. Block 67 sets the DSP instruction to the starting address for the injection routine, loads up desired registers from a buffer which was loaded by the user with desired samples and then loads the DSP code that is being supplanted by the injection process into memory area for safekeeping in block 68. Data blocks selected by the user are written into the DSP circular buffer in block 69 to provide the source of the samples which will be injected. In block 70, the system writes a DSP instruction to branch to the beginning instruction where the injection code is stored in memory and proceeds to the injection routine as shown in FIG. 10 which, when completed, returns to block 71 for a return to the DSP's normal tasks.

Figure 10:
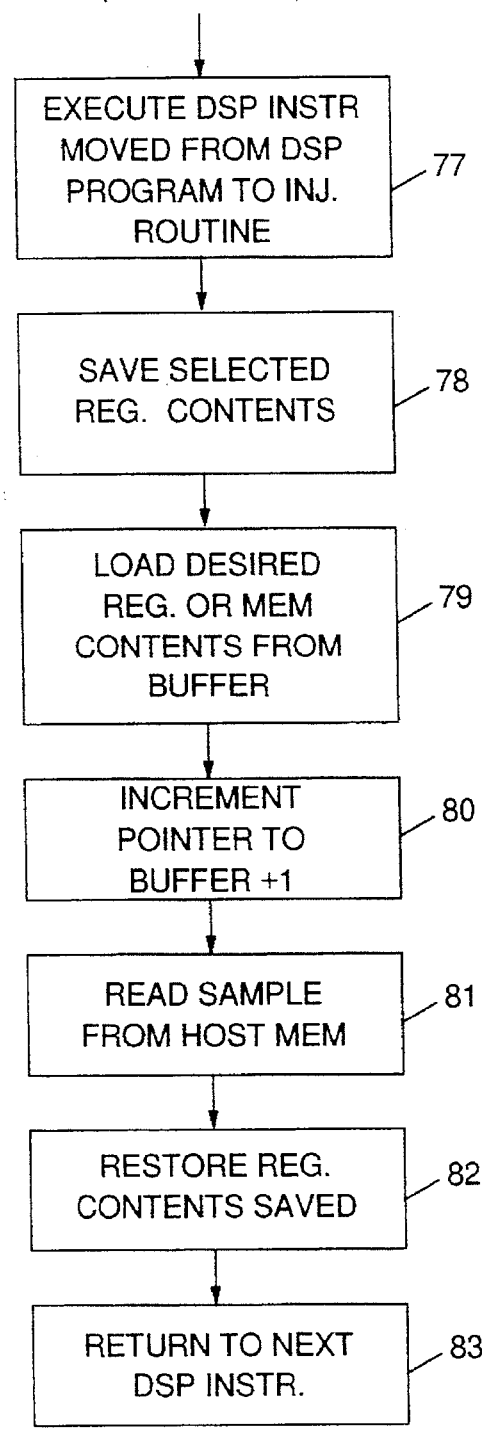
FIG. 10 illustrates schematically the steps in the process for operation under the branch instruction when injection of signal samples into an operating task is desired.

FIG. 10 illustrates the flow of operations for the injection of the samples from the circular buffer beginning with block 77 and ending in block 83 with a return back to the next DSP instruction for execution. Beginning the injection routine in block 77 causes execution of the DSP instruction that was moved to make way for the insertion of a branch instruction to invoke the injection routine. Block 78 saves the DSP's register contents so that the conditions prior to injection may be restored later. Block 79 loads the desired register or memory contents from the circular buffer previously filled with data by the user to represent the signal samples or data to be injected into the execution stream. Blocks 80–82 increment pointer to the circular buffer so that the next injection samples may be accessed, reads samples from the host memory if required in block 81 and finally restores the originally saved register contents when the injection has been completed as shown in block 82. A return to the next DSP instruction via block 83 which would lead back in FIG. 8 to block 71 comes next.

Figure 9:
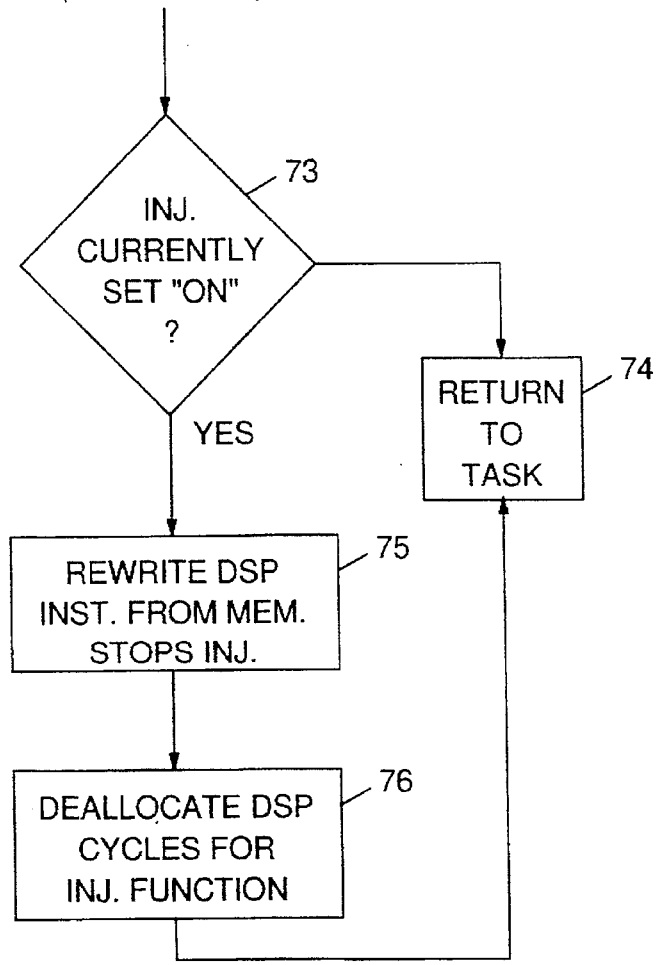
FIG. 9 illustrates the flow of operations for terminating the injection of samples according to the preferred embodiment.

FIG. 9 illustrates the procedure for dropping the injection routine if such a command has been encountered on the input from the user. Block 73 checks whether injection is currently "ON" and if "yes", and the command has been to drop it, blocks 75 and 76 are entered to rewrite to the DSP instruction list the original contents from memory which were replaced by the branch instruction to set the injection probe at that point in the DSP's execution of a given task. In block 76 the DSP cycles are deallocated as the injection function will not be run and a return to the operation of DSP tasks via block 74 is invoked.

As a specific example or illustration of operation of the diagnostic system and method of the present invention, one may consider a typical digital signal processing task such as that alluded to at the beginning of this specification with the speech processing example.

Figures 12A, 12B:
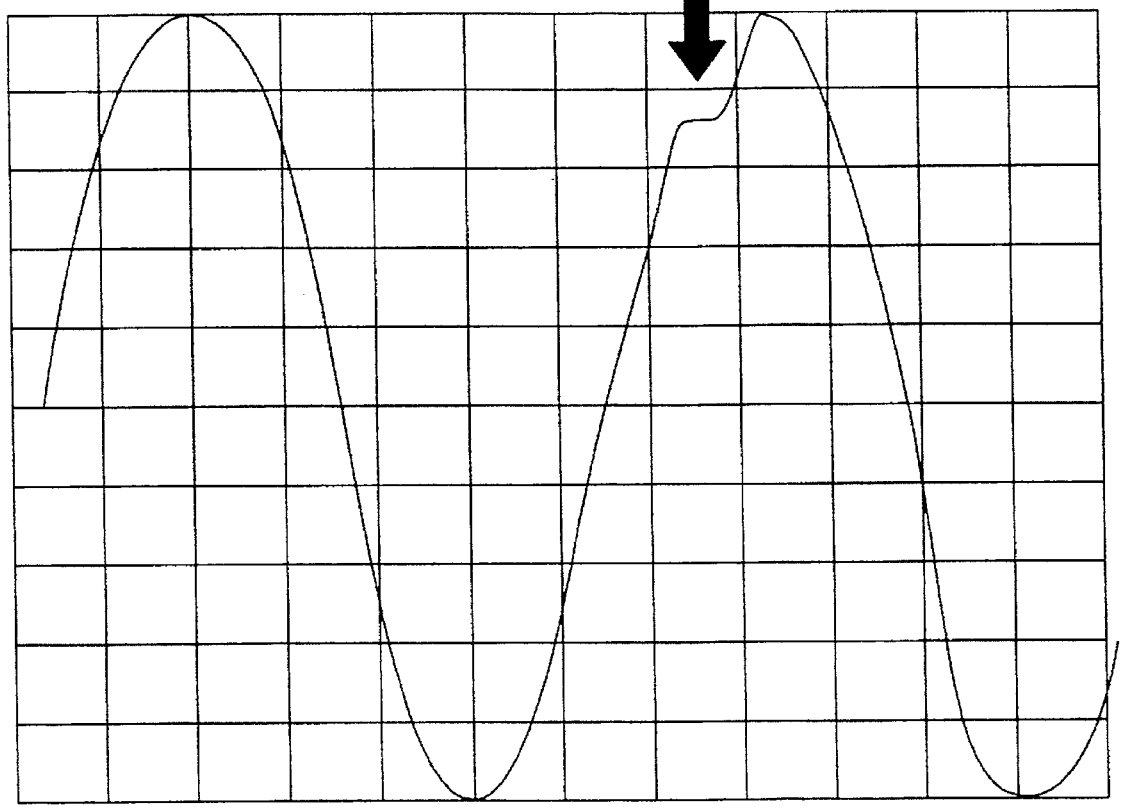
FIG. 12A illustrates an example of a series of data values taken from a sine wave which contain an anomaly.
FIG. 12B illustrates graphically the result of plotting values such as shown in FIG. 12A on the display of a multi-media computer system such as shown in FIG. 11.

In an assumed speech processing task, speech recognition or synthesis operations may be conducted. Typically, 8000 bytes of sample data per second would be required to generate an adequate digital sample for digital voice signal analysis or for reconstruction of a voice through digital-to-analog generators driven by stored data samples. It is clear from such a circumstance that the ordinary stop on command or stop at a given address or stop on a flag condition will not be useful diagnostic tool since the samples will continue to flow or, in the alternative if they do not, operation of the system is so interrupted that observance of its operating condition is not possible. One only need consider that typical speech processing may involve complex digital filtering, fast Fourier transforms and a host of other digital signal processing tasks, all required to run contemporaneously with the provision of the signal samples for recognition or synthesis, to understand that arbitrary interruption of a digital signal processor in mid-stream of a task execution to determine accurately the present operating conditions and to isolate transient behavior flaws is virtually impossible unless the signal stream may be diverted without interrupting flow and displayed in some recognizable fashion for analysis. Even a simple sine wave presented as a string of numbers such as shown in FIG. 12A is virtually incomprehensible to a human diagnostician. FIG. 12A only demonstrates a simple sequence of 32 samples which might not be nearly enough when samples are occurring at 8000 bytes per second to enable a human observer to identify any anomaly in a sequence of numbers. However, utilizing the present invention, these samples may be captured as they occur without overloading the digital signal processor, the samples stored in preferably a circular buffer and unloaded as data blocks for display on the host computer system's display output as a graphic sinusoidal waveform.

Graphic display programs and routines for host systems such as the Intel 80386 are widely known and commercially available. A user may select from any of a variety of these, feeding them with the samples captured by the diagnostic probe and capture process described above and displaying the result as an analog waveform in real-time on the output display of the computer system such as shown in FIG. 11. In its graphical form, the anomaly presented in the sixth column, third horizontal row from the top of FIG. 12A shows up as a distortion in the sinusoidal wave in FIG. 12B, graphically illustrating the power and capability of the present invention to capture and display relatively incomprehensible sequential signal samples in a graphical form for easy comprehension, error detection and analysis.

The preferred embodiment of this invention takes advantage, therefore, of readily available multi-media computer processing systems that incorporate a host computer and display and a digital signal processor to enable easy diagnosis and debugging of digital signal processor tasks in a graphical, easily operated and understood way which does not overload or distort the operation of a hard real-time multi-tasking system. Therefore, it will be apparent to those skilled in the art to modify not only the diagnostic routines actually invoked beyond capture and injection but to include logical alternatives in signal processor task execution routines as well as a ready means of providing hypothetical bug fixes and trying them out in an actual operation. Numerous departures from the basic mechanisms which do not depart from the technique of first analyzing the system for potential overload and then, if overloading will not occur, inserting one or more branch instructions at desired portions of the signal processor's task execution to probe for results occurring instantaneously or to inject arbitrarily desired results to observe their effect may be carried out at high speed, in real-time and observed graphically during the same time without any additional hardware, oscilloscopes, test buffers or generators or the like being required. This will be appreciated by those of skill in the art as a significant advance and an asset to development in debugging of signal processor task applications.

Therefore, what is set forth in the following claims are intended by way of example and not of limitation. Therefore what is claimed is:

1. Means for diagnosing task execution malfunctions in a multi-media system comprising a host computer system, a display and a digital signal processor (DSP) for processing tasks, said means for diagnosing comprising:

means for determining whether invocation of a diagnostic task in said multi-media system will cause a processing overload on said DSP within the execution time of a given task whose execution by said DSP is to be diagnosed; and means for accessing and modifying execution instructions for said task being diagnosed whenever a diagnostic task is invoked and no processing overload is determined to exist, said modification comprising insertion of a branch instruction in said DSP task execution instruction sequence for causing the execution of said task to branch to a diagnostic task instruction, for then executing said instruction and to return to said DSP task to complete real-time execution thereof before the ending of the execution time period of said DSP task.

2. A diagnostic system as in claim 1, further comprising:

means for capturing digital data results occurring in said system during execution of said task in said DSP; and means for displaying a graphical representation based on said data results.

3. A diagnostic system as described in claim 1, further comprising:

means for removing said branch instruction when termination of said diagnostic function is invoked.

4. A diagnostic system as described in claim 2, further comprising:

means for removing said branch instruction when termination of said diagnostic function is invoked.

5. A diagnostic system as described in claim 1 or 2 or 3 or 4, further including:

means for storing said digital data results in an accessible memory queue for access and display by said host system.

6. A diagnostic system as described in claim 2 or claim 4, wherein:

said means for displaying a graphical representation includes said host computer system and display means and means for accessing said digital data results and controlling said display to generate a graphical representation based on said results.

7. A diagnostic system as described in claim 1 or 2 or 3 or 4, further comprising:

means for loading digital data results of any arbitrary value into said DSP facilities during execution of said DSP task; and means for using said digital data results in said DSP task execution in place of the said digital data results which normal execution of said task would create.

8. A diagnostic system as described in claim 5, further comprising:

means for loading digital data results of any arbitrary value into said DSP during execution of said DSP task; and means for using said digital data results in said DSP task execution in place of the said digital data results which normal execution of said task would create.

9. A diagnostic system as described in claim 6, further comprising:

means for loading digital data results of any arbitrary value into said DSP during execution of said DSP task; and means for using said digital data results in said DSP task execution in place of the said digital data results which normal execution of said task would create.

* * * * *